Patented Dec. 12, 1939

2,183,072

UNITED STATES PATENT OFFICE 2,183,072

PROCESS FOR SEPARATING KETONES OF THE STEROL SERIES

Fritz Hanusch, Heidelberg, Germany, assignor to C. F. Boehringer & Soehne G. m. b. H., Mannheim-Waldorf, Germany, a corporation of Germany No Drawing. Application December 23, 1937, Serial No. 181,372. In Germany December 28, 1936

18 Claims. (Cl. 260—397)

My invention relates to compounds of the sterol series, especially those having the properties of sexual hormones or employed for producing such hormones.

It is an object of my invention, to point out ways and means for separating and preparing these substances in a pure condition by more simple and effective methods than was hitherto possible. Other objects of the invention will hereinafter become apparent.

I have discovered, that compounds of the sterol series with not more than two double bonds in the same nucleus behave differently towards acid liquids and that it is possible to base on this different behaviour a process for separating different substances of the above mentioned class of bodies and for isolating and preparing them in a pure condition. I have found that those compounds of this series which carry a keto group and at least one other group containing oxygen, such as for example a hydroxyl group or a keto group or a carboxyl group, are soluble in solutions of acid reacting compounds, in many instances easily soluble, whereas compounds of the same series, which are not characterized by the above mentioned oxygen groups, are insoluble or only slightly soluble in the same solvents.

Compounds of the sterol series are in this instance all those which possess the following nucleus skeleton designated by cyclopentanohydrophenanthrene nucleus skeleton:

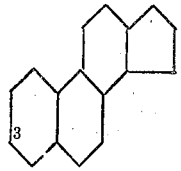

There may be one or more double bonds in the nucleus skeleton, but not more than two double bonds in the same nucleus. Such compounds are, for example, sterols, ketones obtainable from sterols by conversion of the hydroxyl group in position 3 into a ketone oxygen group, bile acids, other compounds in which the side chain of the sterols or bile acids is completely or partly split off. In the case of ketones of the last mentioned group the keto group can be either on the nucleus skeleton or in the side chain.

The invention therefore relates to the separation of compounds of the sterol series with not more than two double bonds in the same nucleus, which possess a keto group and also at least one other group containing oxygen, from compounds of this series which as regards their substituents do not comply with these requirements, by extracting the mixtures with acid reacting compounds or with their solutions and especially their aqueous solutions.

Acid compounds, which are suitable for the separation of the above mentioned substances, are acids mixable in all proportions with water and solutions, especially aqueous solutions, of acid salts. When employing the latter those which are easily soluble in water are preferably used, and concentrated, and if it is required, saturated solutions are employed. When using acids a high concentration is generally the most suitable; even anhydrous acids come into question. On the other hand, however, acids which are diluted to a certain extent with water can be used for the process. Mineral acids, especially strong mineral acids, but also organic acids, especially carbonic acids and sulfonic acids are suitable. It is evident that acid compounds should not be used which, under the existing reaction conditions, exert an undesirable effect, for example an oxidizing effect, on the reaction mixture. If necessary, this undesirable effect can be eliminated or suppressed by a suitable selection of temperature or by other equivalent measures. The following may be mentioned as examples of some acids and salts which can be used successfully: hydrochloric acid in concentrations of 20% and 37%; highly concentrated hydrobromic acid, 70% perchloric acid, 60% and 90% phosphoric acid, 80% and 100% formic acid, highly concentrated methionic acid, and concentrated solutions of such easily soluble salts, with the exception of salts of alkali metals and alkaline earth metals, which have an acid reaction, for example halogenides of zinc, of bivalent tin, of trivalent iron, and also nitrates of bivalent mercury and manganese, especially their aqueous solutions. However, the invention is not restricted to the substances and concentrations mentioned above.

Substances, which are soluble in the above mentioned acid liquids, are for example dehydroandrosterone, androsterone, androstandion, androstendion, testosterone, progesterone, dehydrocholic acid, ketocholenic acid. Insoluble substances are all sterols, and also, for example androstandiol, androstendiol and cholestenone.

The separation is preferably carried through by extracting with an aqueous, especially a high percentage solution of the acid or the acid salt, a solution of the mixture to be separated in an organic solvent, for example a hydrocarbon, such as petrol ether, benzine, benzene, a chlorinated hydrocarbon such as chloroform, or a higher ether or the like. The extraction which can be carried out at a higher or lower temperature, may in some cases be performed even in the absence of organic solvents. The extraction can, if necessary, be repeated once or several times. The portion remaining in the organic solvent or which is insoluble in the acid liquid is separated and can then be treated in known manner to obtain the substances contained therein. The extract or the united extracts from the acid solutions can advantageously be diluted with water, whereby most of the dissolved compounds are precipitated. The extracts can either be distilled off or can be extracted with an organic solvent such as ether, petrol ether or the like. The organic solutions obtained according to the last mentioned method can then be used in the usual manner for the further enriching and for the preparation of the substances in a pure condition.

The process according to the invention enables the separation of substances which, owing to the great similarity of their physical and chemical properties, are extremely difficult to separate by other methods. Thus it has shown to be particularly suitable for the separation of the hormone substances, androstendion and progesterone, being formed by the oxidation of cholestenone, from the excess cholestenone present in the reaction mixture. If the initial material is impure, a purification from other secondary substances and impurities is combined generally with the separation of the sterol derivatives according to the process.

Examples (1) A mixture of 90 parts by weight of cholesterol and 10 parts by weight of dehydroandrosterone is ground several times in a mortar with concentrated hydrochloric acid. Thereby the dehydroandrosterone is dissolved by the hydrochloric acid whereas the cholesterol remains undissolved and may be separated from the acid solution by filtering. The united hydrochloric acid extracts are diluted with water, the dehydroandrosterone precipitating. The aqueous suspension thus formed is shaken out several times with petrol ether. After separating the petrol ether layer and evaporating the solvent, the whole quantity of dehydroandrosterone is obtained, with the exception of an unavoidable loss from working. Instead of using the artificially produced mixture, the process can be applied with equal success to a mixture such as is obtained by the oxidation of acetyl cholesterol dibromide and subsequent debromination. The saponification of the acetyl group otherwise requiring a special step of working up may in this instance, be carried out in this stage of the reaction by gently heating the hydrochloric acid solution.

(2) A mixture of 99 parts by weight of cholestenone and 1 part by weight of androstendion, dissolved in benzene, is repeatedly shaken out with 70% perchloric acid. The acid layer is then separated, amply diluted with water and extracted with ether. When the etheric solution has been washed and dried almost the whole quantity of androstendion is recovered.

(3) A reaction mixture, produced by oxidation of cholestenone by means of chromic acid, which, after the separation of acid and of easily volatile oxidation products, consists chiefly of androstendion and progesterone and of a large quantity of unattacked initial material, is extracted, dissolved in benzene, with concentrated hydrochloric acid. The hydrochloric acid-extracts are diluted with water, whereupon the aqueous solution is extracted with ether. The etheric solution contains the androstendion and the progesterone to a great extent free from admixtures, whereas the greatest part of the cholestenone remains in the extracted benzene solution. The androstendion can then be separated from the progesterone, for example by fractionated crystallization.

(4) The reaction mixture mentioned in Example 3 and being formed by the oxidation of cholestenone is heated with high percentage formic acid. The cholestenone remains undissolved and separates out in oily form, whereas the androstendion and the progesterone are dissolved by the acid.

(5) A solution of 100 milligrams androstendion and 50 milligrams androstendiol in 100 ccms. of petrol ether is extracted several times with a concentrated solution of 100 grams of zinc chloride in 30 ccms. of water. The united zinc chloride solutions are diluted with water and the turbid solutions completely extracted with ether. After evaporation of the ether about 95% of the androstendion remain in the residue. The androstendiol can be obtained in almost pure condition from the extracted petrol ether solution by evaporating the solvent.

(6) A mixture of cholestenone and androstendion is dissolved in hexane and shaken with a concentrated solution of zinc bromide for several hours on a shaking machine. The zinc bromide layer is diluted, weakly acidified and extracted with ether. After evaporation of the solvent the androstendion is obtained free from cholestenone.

(7) A mixture, containing 100 milligrams of androstendion, 50 milligrams of progesterone and 2 grams of cholestenone, is dissolved in 25 ccms. of benzene. The solution thus obtained is extracted several times with a concentrated solution of stannochloride. The separated salt solution is diluted with water, if necessary weakly acidified with diluted hydrochloric acid and extracted with petrol ether. During this process almost the whole quantity of androstendion and progesterone is dissolved by the inorganic solvent, whereas the cholestenone which is not dissolved by the stannochloride, remains in the benzene.

Various changes may be made in the details disclosed in the foregoing specification without departing from the invention or sacrificing the advantages thereof.

In the claims affixed to this specification no selection of any particular modification of the invention is intended to the exclusion of other modifications thereof and therefore no limitations are intended other than those imposed by the claims.

I claim:

1. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of an acid reacting compound not esterifying the said sterol derivatives under the prevailing conditions with the exception of salts of alkali metals and alkaline earth metals.

2. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of a solution of an acid reacting compound not esterifying the said sterol derivatives under the prevailing conditions with the exception of salts of alkali metals and alkaline earth metals.

3. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of an aqueous solution of an acid reacting compound not esterifying the said sterol derivatives under the prevailing conditions with the exception of salts of alkali metals and alkaline earth metals.

4. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of an acid mixable with water not esterifying the said sterol derivatives under the prevailing conditions.

5. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of a solution of an acid mixable with water not esterifying the said sterol derivatives under the prevailing conditions.

6. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of an aqueous solution of an acid mixable with water not esterifying the said sterol derivatives under the prevailing conditions.

7. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of a concentrated aqueous solution of an acid mixable with water not esterifying the said sterol derivatives under the prevailing conditions.

8. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of an inorganic acid mixable with water not esterifying the said sterol derivatives under the prevailing conditions.

9. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of an organic acid mixable with water not esterifying the said sterol derivatives under the prevailing conditions.

10. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of formic acid.

11. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of a concentrated solution of an acid reacting salt with the exception of salts of alkali metals and alkaline earth metals.

12. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of concentrated aqueous solutions of acid reacting salts, with the exception of salts of alkali metals and alkaline earth metals.

13. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of a concentrated aqueous solution of zinc chloride.

14. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising dissolving a mixture which contains both classes of compounds in an organic solvent and extracting them by means of an acid reacting compound not esterifying the said sterol derivatives under the prevailing conditions with the exception of salts of alkali metals and alkaline earth metals.

15. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising extracting a mixture which contains both classes of compounds by means of an acid reacting compound not esterifying the said sterol derivatives under the prevailing conditions with the exception of salts of alkali metals and alkaline earth metals, and separating and subsequently treating the acid extracts in order to recover the compounds contained therein.

16. Process for the separation of compounds of the sterol series with not more than two double bonds in the same nucleus, which compounds carry a keto group and in addition thereto at least one other group containing oxygen, from compounds of this series, which as regards their substituents do not comply with these conditions, comprising dissolving a mixture which contains both classes of compounds in an organic solvent, extracting the dissolved mixture by means of an acid reacting compound not esterifying the said sterol derivatives under the prevailing conditions with the exception of salts of alkali metals and alkaline earth metals, and subsequently treating the acid extract in order to recover the compounds contained therein.

17. Process for separating androstendion and progesterone from cholestenone, comprising extracting the mixture by means of an acid reacting compound not esterifying the said sterol derivatives under the prevailing conditions with the exception of salts of alkali metals and alkaline earth metals and subsequently treating the acid solution in order to recover androstendion and progesterone.

18. Process for the separation of androstendion and progesterone from cholestenone, comprising dissolving the mixture in an organic solvent, extracting the dissolved mixture by means of an acid reacting compound not esterifying the said sterol derivatives under the prevailing conditions with the exception of salts of alkali metals and alkaline earth metals and subsequently treating the acid solution in order to recover androstendion and progesterone.

FRITZ HANUSCH.